United States Patent
Haustein et al.

(10) Patent No.: US 8,781,402 B2
(45) Date of Patent: Jul. 15, 2014

(54) METHOD FOR GENERATING COOPERATION AREAS IN COMMUNICATIONS NETWORKS AND CORRESPONDING NETWORK NODES

(75) Inventors: Thomas Haustein, Potsdam (DE); Egon Schulz, München (DE); Wolfgang Zirwas, München (DE)

(73) Assignee: Nokia Siemens Networks Oy, Espoo (FI)

( * ) Notice: Subject to any disclaimer, the term of this patent is extended or adjusted under 35 U.S.C. 154(b) by 334 days.

(21) Appl. No.: 13/141,474

(22) PCT Filed: Dec. 9, 2009

(86) PCT No.: PCT/EP2009/066682
§ 371 (c)(1),
(2), (4) Date: Sep. 6, 2011

(87) PCT Pub. No.: WO2010/072565
PCT Pub. Date: Jul. 1, 2010

(65) Prior Publication Data
US 2011/0312357 A1  Dec. 22, 2011

(30) Foreign Application Priority Data
Dec. 23, 2008  (EP) .................................. 08106029

(51) Int. Cl.
*H04B 1/00* (2006.01)
*H04B 7/00* (2006.01)
*H04B 17/00* (2006.01)

(52) U.S. Cl.
USPC .................... 455/67.11; 455/63.1; 455/226.1; 455/513

(58) Field of Classification Search
USPC .......... 455/522, 69, 127.1, 67.13, 63.1, 226.1
See application file for complete search history.

(56) References Cited

U.S. PATENT DOCUMENTS

| 8,055,198 B2 * | 11/2011 | Benes et al. ................. 455/63.1 |
| 8,064,922 B2 * | 11/2011 | Aiba et al. ................. 455/452.2 |
| 8,233,427 B2 * | 7/2012 | Reial et al. ..................... 370/318 |

(Continued)

FOREIGN PATENT DOCUMENTS

| EP | 1 962 539 A1 | 8/2008 |
| WO | WO 2007/093219 A1 | 8/2007 |

OTHER PUBLICATIONS

Choi, W., et al., "The Capacity Gain from Intercell Scheduling in Multi-Antenna Systems", © 2008 IEEE, pp. 714-725.

*Primary Examiner* — Tilahun B Gesesse
(74) *Attorney, Agent, or Firm* — Harrington & Smith (57) ABSTRACT

The present invention refers to generating of cooperation areas in a communications network, wherein each cooperation area is defined by at least two base stations of said communications network, which are cooperating when communicating with mobile nodes in said communications network. In particular, a number of sets of possible interferers is transmitted to at least one mobile node by a base station, wherein with each set of possible interferers an index value associated to said set of possible interferers is transmitted. Then, said mobile node selects a set of possible interferers from said number of sets of possible interferers and transmits a selected index value to said base station, said selected index value being an index value associated to said selected set of possible interferers. Hereupon, a cooperation area for said mobile node is defined by said base station by use of said selected index value.

13 Claims, 3 Drawing Sheets

(56) References Cited

U.S. PATENT DOCUMENTS

2003/0186653 A1* 10/2003 Mohebbi et al. ........... 455/67.11
2007/0082619 A1* 4/2007 Zhang et al. .................... 455/69
2011/0086651 A1* 4/2011 Li et al. ........................ 455/501

* cited by examiner

METHOD FOR GENERATING COOPERATION AREAS IN COMMUNICATIONS NETWORKS AND CORRESPONDING NETWORK NODES

FIELD OF THE INVENTION

The present invention relates to generating of cooperation areas in communications networks, in particular, in telecommunications networks. Particularly, the present invention refers to methods and network nodes, both configured for generating of cooperation areas in a communications network, wherein each cooperation area is defined by at least two base stations or nodes B respectively of the communications network, which are cooperating when communicating with mobile nodes in said communications network.

BACKGROUND OF THE INVENTION

In communications networks, in particular, in telecommunications networks interference handling is still a challenging task.

In communications networks, in which cooperative antenna systems (COOPA) are exploited, i.e., in which at least one cooperation area are used, it has to be defined, which base stations should cooperate within cooperation areas.

Currently, two approaches for defining cooperation areas have established themselves: a network centric approach and a user centric approach.

In case of the network centric approach, the cooperation areas are predefined by the mobile network operator, e.g., based on the geographical vicinity of the cells. This is a simple approach, but at the same time it limits the achievable performance gain as another combination of cells might represent a better choice. In reality, far-off cells might contribute significant interference if there is, e.g., a direct line of sight (LOS) connection between a far-off base station or node B respectively and the user equipment or mobile node respectively. At the same time, the interference from nearby cells might be blocked or shadowed by buildings or other obstacles.

According to the user centric approach, user equipments or mobile nodes respectively define communication areas based on measurements of their currently strongest interferers. The measurements of currently strongest interferers are provided by the user equipments or mobile nodes to the corresponding base stations or nodes B respectively. The base stations or nodes B are then responsible for final organization or definition of the corresponding cooperation areas.

However, a cellular radio system consists of a very large set of base stations or nodes B. Thus, in case of a user centric definition of cooperation areas mobile nodes or user equipments respectively will have to do repeatedly measurements on a large set of cell IDs, in extreme case, of all cell IDs to find out the set of currently strongest interferers. The size of the set, which has to be estimated, depends on the number of cells, which should form cooperation areas. The size of sets will be typically given in advance by the network. Usually, it will be in the order of 3 to 5. Thus, expensive measurement efforts have to be spent if it has to be determined in advance, which cell IDs are relevant for a user equipment or mobile node respectively.

Thus, there is still a need for improving approaches and methodologies of handling interferences in communications networks.

SUMMARY OF THE INVENTION

Object of the present invention is improving of handling interferences in communications networks, in which cooperation areas are defined for communication between mobile nodes or user equipments respectively and base stations or nodes B respectively.

The object of the present invention is achieved by a method for generating cooperation areas in a communications network, wherein each cooperation area is defined by at least two base stations of said communications network, which are cooperating when communicating with mobile nodes in said communications network, said method comprising:

transmitting (e.g., by broadcasting) of a number of sets of possible interferers to at least one mobile node by a base station, wherein with each set of possible interferers an index value associated to said set of possible interferers is transmitted (e.g., broadcasted);

receiving of a selected index value from said at least one mobile node by said base station, said selected index value being associated to a set of possible interferers selected from said number of sets of possible interferers; and defining of a cooperation area for said at least one mobile node by said base station by use of said selected index value.

This method can be performed, e.g., by a base station or by a node B in a communications network.

Here, each set of possible interferers comprises interferers possible for interfering communication of said at least one mobile node in an area of said communications network, in which said at least one mobile node is located.

In this way, the present invention enables a flexible, efficient and fine grained generating of cooperation areas in communications networks, wherein the cooperation areas are defined such that level of interference is minimized in the defined cooperation areas.

According to an embodiment of the present invention, the method comprises a receiving of a set of interferers from said at least one mobile node by said base station, said set of interferers comprising interferers interfering communication of said at least one mobile node in said communications network.

Thus, according to the present invention base stations or nodes B are informed by the mobile nodes or user equipments of the actual situation in the network from the point of view of the corresponding mobile nodes or user equipments. In this way, an improved generating of cooperation areas is enabled as concrete and actual point of view of the corresponding mobile nodes or user equipments is taken into consideration by the base stations or nodes B responsible for generating of cooperation areas.

According to an embodiment of the present invention, the method comprises a determining of at least one set of possible interferers by use of said set of interferers.

Here, according to a further embodiment of the present invention, the determining comprises evaluating of said set of interferers at said base station by determining strongest interferers in said set of interferers.

In this way, efficiency improvement is achieved as a pre-selection of interferers is performed in a centric way by a base station or node B.

According to an embodiment of the present invention, the method comprises a collecting of said number of sets of possible interferers by said base station.

Thus, it is ensured, that a base station or node B will always be aware of the actual situation with regard to interference in the communications network.

The object of the present invention is achieved also by a computer program product comprising a code, the code being configured to implement and/or perform the method introduced above and explained in more detail bellow.

According to an embodiment of the present invention, the code is embodied on a data carrier. According to a further embodiment of the present invention, the computer program product is configured to perform said method when the computer program product is executed by a processing unit like a processor, for example.

The object of the present invention is achieved also by a data carrier comprising the computer program product as introduced above.

The object of the present invention is achieved by a base station (or node B, respectively), said base station being configured for generating cooperation areas in a communications network, wherein each cooperation area is defined by at least two base stations of said communications network, which are cooperating when communicating with mobile nodes in said communications network, said base station comprising:

a transmitting module, said transmitting module being configured to transmit (e.g., by broadcasting) a number of sets of possible interferers to at least one mobile node, wherein with each set of possible interferers an index value associated to said set of possible interferers is transmitted (e.g., broadcasted);

a receiving module, said receiving module being configured to receive a selected index value from said at least one mobile node, said selected index value being associated to a set of possible interferers selected from said number of sets of possible interferers; and a cooperation area defining module, said cooperation area defining module being configured to define a cooperation area by use of said selected index value.

In particular, the bases station is configured such that it performs the steps of the method for generating cooperation areas in a communications network as sketched above and explained in more detail bellow, wherein the base station is configured such that it comprises the corresponding modules and/or means for performing the corresponding steps.

Further, the object of the present invention is achieved by a method for generating cooperation areas in a communications network, wherein each cooperation area is defined by at least two base stations of said communications network, which are cooperating when communicating with mobile nodes in said communications network, said method comprising:

receiving of a number of sets of possible interferers from a base station at a mobile node, wherein with each set of possible interferers an index value associated to said set of possible interferers is received;

selecting of a set of possible interferers from said number of sets of possible interferers by said mobile node (for defining of a cooperation area for said mobile node by said base station); and transmitting of a selected index value to said base station by said mobile node, said selected index value being an index value associated to said selected set of possible interferers (for defining of a cooperation area for said mobile node by said base station by use of said selected index value).

Here it has to be noted, that this method will be performed, e.g., by a mobile node or user equipment.

When generating cooperation areas according to the present invention, a corresponding communication of information between a base station or node B and mobile nodes or user equipments is required before deciding on a cooperation area. Therefore, two methods for generating cooperation areas in a communications network are presented by the present invention: the one is performed at the base station or node B side, the other one is performed on the side of mobile nodes or user equipments.

According to the present invention base stations or nodes B inform the mobile nodes or user equipments of the actual situation in the network from a more broad view. In this way, a more broad consideration of potential interferers by mobile nodes or user equipments is enabled. Thus, the present invention enables an improved consideration and awareness of possible interferers at the mobile nodes or user equipments, which in turn leads to improved decisions when generating cooperation areas.

According to an embodiment of the present invention, the method comprises a transmitting of a set of interferers to said base station by said mobile node, said set of interferers comprising interferers interfering communication of said mobile node in said communications network.

According to a further embodiment of the present invention, the number of sets of possible interferers is determined by said base station based on said set of interferers.

According to an embodiment of the present invention, said selecting of said set of possible interferers comprises:

checking of each set of possible interferers of said number of sets of possible interferers with regard to strength of interfering of said mobile node; and selecting said set of possible interferes such that it has the highest strength of interfering of said mobile node.

The object of the present invention is achieved by a computer program product comprising a code, the code being configured to implement and/or to perform the method introduced above and explained in more detail bellow.

According to an embodiment of the present invention, the code is embodied on a data carrier. According to a further embodiment of the present invention, the computer program product is configured to perform said method when the computer program product is executed by a processing unit like a processor, for example.

The object of the present invention is achieved by a data carrier comprising said computer program product sketched above.

The object of the present invention is achieved by a mobile node, said mobile node being configured for supporting of generating of cooperation areas in a communications network, wherein each cooperation area is defined by at least two base stations of said communications network, which are cooperating when communicating with mobile nodes in said communications network, said mobile node comprising:

a receiving module, said receiving module being configured to receive a number of sets of possible interferers from a base station, wherein with each set of possible interferers an index value associated to said set of possible interferers is received;

a selecting module, said selecting module being configured to select a set of possible interferers from said number of sets of possible interferers; and a transmitting module, said transmitting module being configured to transmit a selected index value to said base station, said selected index value being an index value associated to said (selected) set of possible interferers.

In particular, the mobile node or user equipment is configured to perform the steps of the method introduced before the mobile node directly and explained in more detail bellow. Thus the mobile node or user equipment comprises corresponding modules and/or means configured to perform the steps of said method.

Thus, the present invention refers to generating of cooperation areas in a communications network, wherein each cooperation area is defined by at least two base stations of said communications network, which are cooperating when communicating with mobile nodes in said communications network. In particular, a number of sets of possible interferers is transmitted to at least one mobile node by a base station, wherein with each set of possible interferers an index value associated to said set of possible interferers is transmitted. Then, said mobile node selects a set of possible interferers from said number of sets of possible interferers and transmits a selected index value to said base station, said selected index value being an index value associated to said selected set of possible interferers. Hereupon, a cooperation area for said mobile node is defined by said base station by use of said selected index value.

The present invention enables a user centric generating of cooperation areas with minimal signalling and measurement overhead, in particular, as the messages comprising sets of possible interferers are transmitted in a coordinated way by base stations or nodes B. If broadcasting is used for transmitting said messages, for example, a more efficient transmitting can be performed. Furthermore, a coordinated and efficient providing of information of actual interferers is performed on side of mobile nodes and user equipments, which enables the base stations or nodes B a systematic, effective, and efficient determination of the current situation in a communications network and an effective and efficient defining of cooperation areas. Here, the defining of cooperation areas is performed such, that assigning of mobile nodes or user equipments to respective cooperation areas takes into account interferers of the mobile nodes or user equipments. Thus, a defined cooperation area will comprise only such mobile nodes or user equipments, which do not interfere each other. Thus, an improved quality of the defined cooperation areas is ensured. Further, an improved handling of interference is provided in such a way.

BRIEF DESCRIPTION OF THE DRAWINGS

The present invention will be more clearly understood from the following description of the preferred embodiments of the invention read in conjunction with the attached drawings, in which.

DESCRIPTION OF THE PREFERRED EMBODIMENTS

Figure 1:
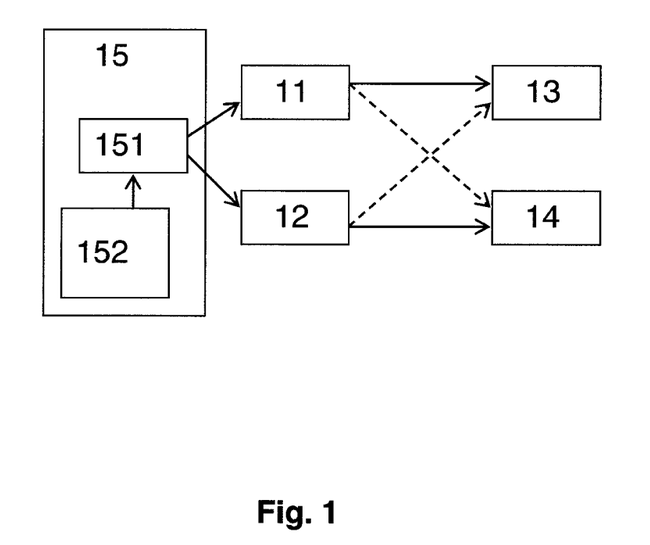
FIG. 1 shows base stations and mobile nodes communicating in a common cooperation area of a communications network according to an embodiment of the present invention.

In FIG. 1 a cooperation area in a communications network is shown. According to the embodiment of FIG. 1, the cooperation area comprises two base stations 11, 12 and two mobile nodes 13, 14. Here, communication in the cooperation area is established by use of a cooperative antenna system. Use of cooperative antenna systems in communications networks is common. According to the present invention, several types of known cooperative antenna systems can be exploited.

According to the present embodiment, a central unit 15 of the cooperation area performs common signal pre-coding, which is basically a matrix multiplication of all data signals with a pre-coding matrix 151. In case of zero forcing, the pre-coding matrix will be a pseudo inverse matrix of the overall channel matrix. According to the present embodiment, a codebook based pre-coding is used exemplary. Here, it has to be noted that the present invention is not restricted to codebook based pre-coding only.

According to the present embodiment, the pre-coding matrix 151 is selected from a codebook 152 based on estimated radio channels between the involved base stations 11, 12 and mobile nodes 13, 14, e.g., by using uplink-downlink reciprocity for TDD (Time-Division Duplex) systems or by explicit signalling by the mobile nodes or user equipments 13, 14. The code-book 152 is managed and provided by the central unit 15 of the cooperation area. The use of the common pre-coding matrix 151 by the base stations 11, 12 in the cooperation area is illustrated by arrows connecting the pre-coding matrix 151 and the corresponding base stations 11, 12.

According to the present embodiment, a first mobile node or user equipment 13 is assigned to a first base station 11 and is supposed to receive data over a transmission channel presented as an arrow from the base station 11 to the mobile node 13. A second mobile node or user equipment 14 is assigned to a second base station 12 and is supposed to receive data over a transmission channel presented as an arrow from the base station 12 to the mobile node 14.

When operating communication between the first base station 11 and the first mobile node 13 and between the second base station 12 and the second mobile node 14, the first mobile node 13 will receive signals also from the second base station 12 and the second mobile node 14 will receive signals also from the first base station 11.

To substantially cancel interference caused by first data received at the first mobile node 13 from the first base station 11 and by second data received at the second mobile node 14 from the second base station 12, joint transmission is used according to the present embodiment. In particular, the joint transmission is performed by transmitting the first data from the first base station 11 to the second mobile node 14 and by transmitting the second data from the second base station 12 to the first mobile node 13. In FIG. 1, this transmission is shown by the interrupted arrows between the corresponding base stations 11, 12 and mobile nodes 13, 14. According to the present embodiment, transmission of data is provided by multiplying data to be transmitted on a channel by the corresponding weight factor of the channel. In FIG. 1 the channels are shown by continuous or interrupted arrow. The weight factors of communications channels are obtained from weight matrix 151 of the central unit 15 of the cooperation area. The coordinated obtaining of weight factors of channels in the cooperation area is visualized by arrows connecting the weight matrix 151 (provided by the central unit 15 of the cooperation area) and the base stations 11, 12 in FIG. 1.

When considering FIG. 1, it becomes apparent that definition of cooperation areas is a challenging task as interfering components have to be taken into account.

For mobile nodes, combination of strongest interferes might easily change while the mobile node is moving from one location to the next one as typical correlation of large scale parameters like path loss to a specific cell, for example, is in the order of 50×50 $m^2$. Here, it has to be noted, that the specification of 50×50 $m^2$ is provided exemplary and that the present invention is not restricted to this specification only.

In has to be noted, that, according to the present invention, cells participating in a cooperation area can be defined also per cell, as done by current approaches.

Furthermore, the present invention provides the possibility of defining of cells participating in a cooperation area also per geographical area. In case, a mobile node is moving from one area to the next, the defined cells have to be adapted. As organization of cooperation areas can be done based on large scale parameters (e.g. by correlation of the large scale parameters as indicated above), a semi-static adaptation of the cooperation areas will be usually sufficient. Simulation results show that a user centric definition of cooperation areas provides a large gain over fixed and network centric definition of cooperation areas. According to the present invention, an approach of user centric definition of cooperation areas is provided.

Figure 2:
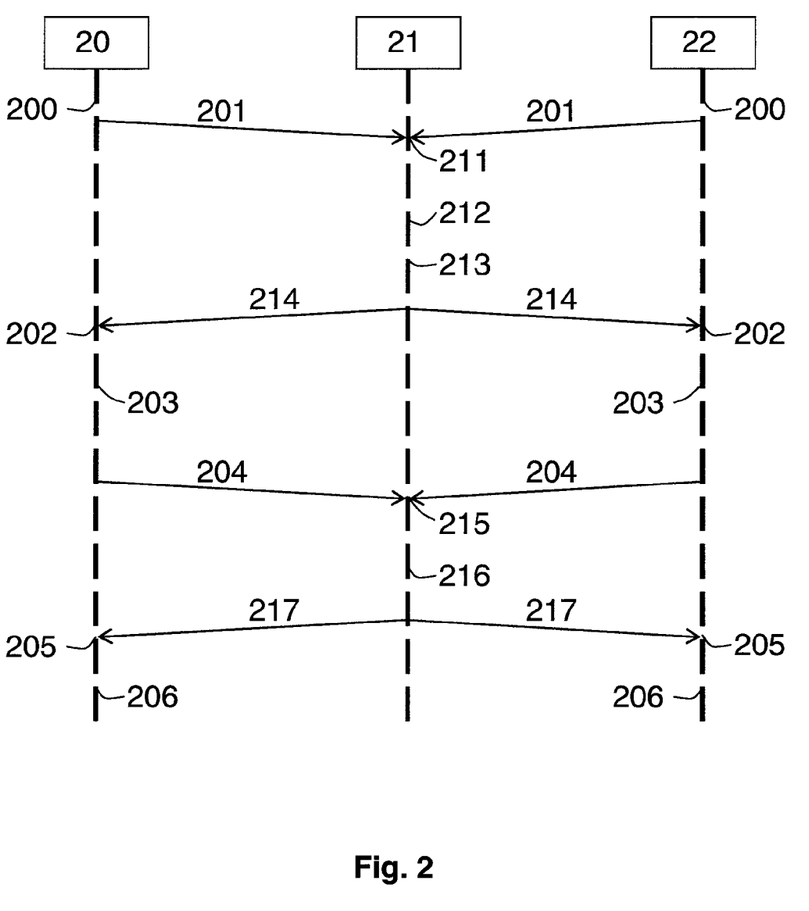
FIG. 2 shows a sequence diagram presenting generating of a cooperation area according to an embodiment of the present invention.

FIG. 2 presents a sequence diagram showing generating of a cooperation area according to an embodiment of the present invention.

According to the present embodiment, base stations can know or may learn over time, which type of cooperation areas including which base stations with which cell IDs are possible within their own cell and which on the other hand are not relevant.

Under the exemplary assumption of a correlation of large scale parameters over an area of about 50×50 m$^2$ as being reported from different outdoor measurements and a cell size of about 400×400 m$^2$, there might be up to about 64 areas with different combinations of strongest interferers. I.e., a mobile node changing from one area to the next will have to be put into a different cooperation area.

Here, it has to be pointed out, that the specifications of size of geographical areas for defining cooperation areas, of cell sizes, and of amounts of possible areas are provided exemplary. The present invention is not restricted only to these specifications. The specifications can vary in dependence of a concrete use case or environment of a communications network.

As the large scale parameters define each cooperation area and as large scale parameters will typically change slowly over time—e.g., only due to a change of foliage over the seasons or maybe due to a blocking truck—different mobile nodes coming into the same area will see the same set of strongest interferers.

According to FIG. 2, two mobile nodes 20, 22 and a base station 21 are provided. When performing generating of cooperation areas according to the present embodiment, each of the mobile nodes 20, 22 scan or detect in step 200 such interferers, which interfere the communication of the mobile nodes 20, 22. The interferers can be provided, e.g., by denoting cell IDs of cells interfering the mobile node 20, 22. In particular, each of the mobile nodes 20, 22 will detect its own strongest interferer set. In step 201, the mobile nodes 20, 22 transmit the corresponding detected sets of interferers to the base station 21. The transmitting of the sets of interferers can be performed in several ways, e.g. periodically, by own initiative, e.g., by own transmitting criteria, or after receiving of a corresponding request transmitted by the base station 21, for example. In the latter case, the base station 21, will be configured to transmit corresponding requests to mobile nodes 20, 21, e.g., periodically or in dependence of further criteria.

Then, the base station 21 receives in step 211 the sets of interferers and collects them in step 212.

The base station 21 can collect the sets of interferers as received. This is denoted by step 212 in FIG. 2. Further, within the scope of collecting 212, the base station 21 can revise the received sets of interferers, e.g., with regard to strength of interference arising from the interferers comprised in the sets.

In both cases, when the base station 21 collects the sets of interferers, a unique set identification or index value respectively is assigned to each of the sets by the base station 21.

In the second case, if the base station 21 revises the sets of interferers received from mobile nodes 20, 22, the collecting 212 of the sets of interferers comprises measuring of strength of interference for each of interferers comprised in the sets of interferers and removing of such interferers, the strength of interference of which is not strong or high enough. For this purpose, a threshold value can be used, for example. If the determined strength of interference of an interferer is below the threshold value, the interferer is removed from the corresponding set of interferers. In this way, a reorganization of existing sets of interferers is possible. Here, also adding of new interferers to an existing set of interferers is possible, if the base station 21 gets knowledge about such an interferer.

Defining of unique set identification or index value respectively for a set of interferers can be performed by known methods of identification or index generating. E.g., the identification or index value can be defined in the order in which the sets will be transmitted by the base station 21 to mobile nodes 20, 22 in step 214.

In step 214, the base station 21 transmits the sets of possible interferers with the corresponding identifiers or index values respectively to the mobile nodes 20, 22. The transmitting 214 can be performed, e.g., by broadcasting of the sets of interferers to the mobile nodes 20, 22. Here, several appropriate ways of transmitting information to at least one network node can be used.

In step 214, all sets of interferers available and/or collected by the base station 21 or a selected part of these sets can be transmitted according to the present invention.

If a selected part of the sets of interferers as received 211 and/or collected 212 is transmitted, a selecting procedure 213 is performed by the base station 21 with regard to mobile node 20, 22, which should receive the corresponding sets of interferers. Here, the selecting procedure 213 can comprise a determining of the area the mobile node 20, 22 is located in the communications network and a determining or selecting of such sets of interferers relevant for this area. The determining of the area the mobile node 20, 22 is located can be performed in an exact or in an approximate way. E.g., the base station 21 can analyse the set of interferers received from the mobile node 20, 22 and, by use of knowledge of interferers interfering the mobile node 20, 22, derive or determine an estimated location of the mobile node 20, 22.

Thus, the sets of interferers transmitted in step 214 comprise sets of possible interferers of the mobile nodes 20, 22. For the possible interferers, it is assumed that they interfere or that they can interfere the corresponding mobile node 20, 22.

The mobile node 20, 22 receives in step 202 a number of the sets of possible interferers and checks each set of possible interferers with regard to strength of interfering of the mobile node 20, 22 in step 203. Here, a checking of each set received is performed, wherein each possible interferer is checked with regard to its strength of interfering of the mobile node 20, 22. Thus, for example, the mobile node 20, 22 can perform channel state information estimations for cell IDs denoted by the possible interferers comprised in the sets transmitted. As mentioned above, the interferers can indicate cell IDs of cells interfering the mobile node 20, 22. Thus, the channel state information estimations can be performed with regard to cells, IDs of which are noted as possible interferers in the received sets of possible interferers.

The possible interferers in the sets of possible interferers can be ordered by their probability of occurrence, i.e., the probability that the possible interferer actually will interfere the mobile node 20, 22. This determining of the probability of occurrence or interfering and this ordering of possible interferers in the sets of possible interferers according to the probability of interfering or occurring respectively can be performed by the base station 21 before transmitting 214 of the corresponding sets in step 213.

This ordering 213 of the sets of possible interferers has the advantage that the mobile node 20, 22 will start searching for the best fitting set of possible interferers, wherein the view of "best fitting" is provided at first by the base station 21 and actually has to be corroborated by the corresponding mobile node 20, 22.

Further, the length of each set can be configured such that it is at least as long as the size of the cooperation areas. According to an embodiment of the present invention, an enlarged list containing some further possible interferers can be transmitted in step 214. This is advantageous in cases if some of the other interferers are missing for some reason. Further, performance of an IRC receiver at the mobile node 20, 22 side can be improved in such a way.

In step 203, the mobile nodes 20, 22 check the sets of possible interferers. By this checking, the mobile nodes 20, 2 search the best fitting set of possible interferers (cell IDs, for example). When a fitting or the best fitting set of possible interferers has been found or selected, the identification or index value assigned by the base station 21 to the selected or found fitting set of possible interferers is noticed (or selected).

Then, the mobile nodes 20, 22 transmit 204 the corresponding selected identification or index value to the base station 21. The corresponding selected identification or index value is received by the base station 21 in step 215.

Based on this information the base station 21 has a rough information abut the current location of the mobile nodes 20, 22, which is helpful for grouping users or mobile nodes 20, respectively. In step 216, by use of the received identifications or index values, a defining of a cooperation area is performed by the base station 21. The defining of cooperation areas can be performed by performing of user grouping.

User grouping is a means, module, or component configured to improve performance within cooperation areas by avoiding difficult user constellations with large path loss differences and with low rank of the combined channel matrix (weight matrix 151 of FIG. 1, for example). In case of random user combinations in a cooperation area there might be, e.g., large correlation between two users. Thus, a large power enhancement is required due to interference cancellation based on zero forcing algorithms. By grouping users from areas with large spatial separation, a good chance to have a low correlation between the channels exists. As the users will stay in their areas for correspondingly long time, the user grouping will be valid for long times as well and can be done semi-statically or per connection setup.

In step 217, the base station 21 informs the mobile node 20, about the cooperation area it belongs to. This can be performed semi statically, for example.

The mobile node 20, 22 receives the information about the cooperation area in step 205. Then, based on this information, the mobile node 20, 22 will start in step 206 measuring of the channel state information for such cell IDs of the base station 21, which are forming its current cooperation area.

In case, data have to be transmitted, the base station 21 will request a corresponding channel state information from the mobile nodes 20, 22 on the full or part of the frequency band and will use this information to propose downlink pre-coding.

Here, when informing the mobile node 20, 22 about the cooperation area it belongs to, the base station 21 can provide an index value associated to a set of possible interferers to the mobile node 20, 22, said set of possible interferers being characteristic for the cooperation area the mobile node 20, 22 has been associated to by the base station 21. To be aware that the determined and associated cooperation area is still the right one, i.e., best fitting to the mobile node 20, 22, as the mobile node 20, 22 can change its position in the network at any time, the mobile node 20, 22 can be configured to measure the power of receiving with regard to base stations or nodes B, which can be identified by use of the set of possible interferers characteristic for the cooperation area, and to transmit the results of the measurements to the base station 20. This can be performed regularly or as an answer to a corresponding request from the base station 20.

In this way, the base station 20 will be aware of whether the mobile node 20, 22 still belongs to the most appropriate communication area and can determine a new communication area according to the present invention, if needed.

In following, some more specific embodiments with regard to the steps provided above will be provided.

In cases of some nearby obstacles like a person or a car or due to the effect of the mobile node antenna pattern at the mobile node, one or few probable interferers out of the selected set of probable interferers might be blocked in a specific area. According to an embodiment of the present invention, the mobile node 20, 22 can transmit in step 204 with the selected index value also a list with further possible interferers, which have been not measured or have been measured below a certain threshold. The base station 21 will then reduce the size of the cooperation area for this mobile node 20, 22 accordingly or request the mobile node 20, 22 to report the next strongest interferers.

On the other hand the mobile node 20, 22 might know about some more possible interferers than that transmitted by the base station 21 in step 214 with the sets of possible interferers. According to an embodiment of the present invention, the mobile node 20, 22 can send in step 204 an additional message with the additional possible interferers. So the base station 21 can include the according additional possible interferers transmitted in the additional message into the cooperation area of the mobile node 20, 22.

According to a further embodiment of the present invention, for better handover support, adjacent base stations being adjacent to the base station 21 might transmit in step 214 in addition to their own number of sets of possible interferers also the number of sets of possible interferers of the neighbouring base stations so that the information is already available to the moving mobile nodes 20, 22. Then the mobile nodes 20, 22 know already in advance, where to measure.

According to a further embodiment of the present invention, the base station 21 can transmit in step 214 the number of sets of possible interferers with additional information. The additional information can contain, for example, the exact spatial locations, where a specific index or specific set of possible interferers from the number of sets of possible interferers is relevant. Based on this location information, mobile nodes 20, 22 having own location information can directly select the right index based on this location information. The mobile nodes 20, 22 can then have access to this location information, e.g., by GPS (Global Positioning System) or specific navigation tools.

Figure 3:
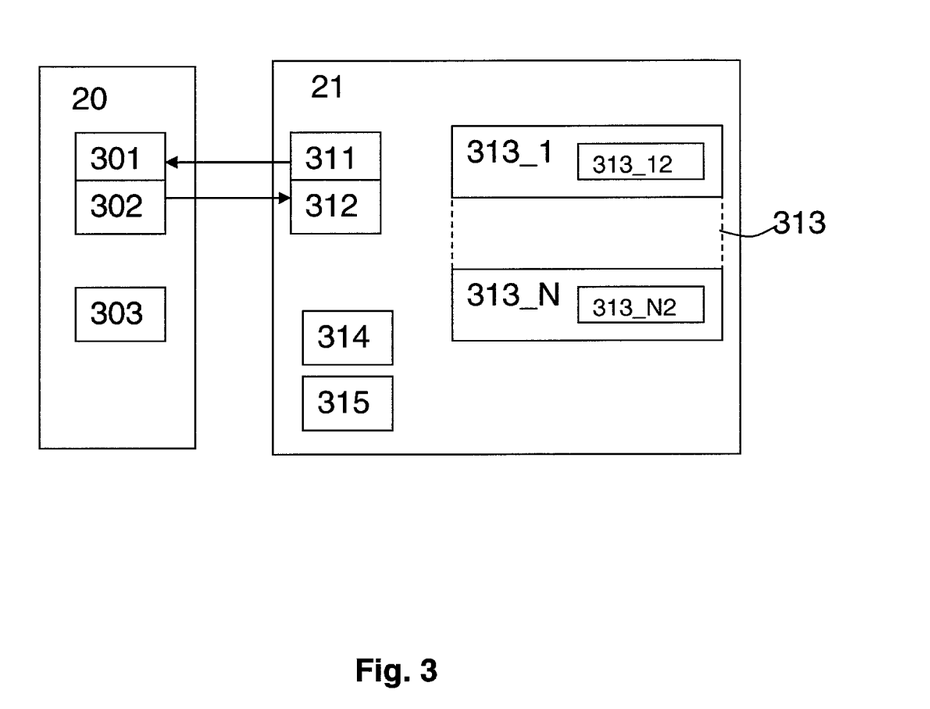
FIG. 3 shows a block diagram presenting a configuration of a base station and of a mobile node according to an embodiment of the present invention.

FIG. 3 presents a block diagram showing configuration of a base station 21 and of a mobile node 20 according to an embodiment of the present invention.

In following, the modules or components of the base station 21 and mobile node 20 will be explained by referring to steps of FIG. 2, as the modules or components are configured to enable the base station 21 and mobile node 20 to perform the present invention. Further, it has to be noted that the modules or components of the base station 21 and mobile node 20 can be software and/or hardware modules or components.

According to the present embodiment, the mobile node 20 comprises receiving module 301 configured for receiving information, in particular, for receiving information as explained above with regard to steps 202 and 205 of FIG. 2. Further, the mobile node comprises transmitting module 302 configured for transmitting information, in particular, for transmitting information as explained above with regard to steps 201 and 204 of FIG. 2.

Further, the base station 21 comprises receiving module 312 configured for receiving information, in particular, for receiving information as explained above with regard to steps 211 and 215 of FIG. 2. Further, the mobile node comprises transmitting module 311 configured for transmitting information, in particular, for transmitting information as explained above with regard to steps 214 and 217 of FIG. 2.

Thus the receiving and transmitting module 201, 202, 211, 212 of the mobile node 20 and of the base station 21 are configured for enabling communication for the corresponding components in the communications network.

Further, the base station 21 comprises a collecting module 313 configured for performing the collecting step 212 of FIG. 2 as exemplary provided above. The collecting module 313 comprises sets of interferers 313_1, ..., 313_N, wherein to each of them a corresponding set identifier or index value respectively 313_12, ..., 313_N2 is assigned and associated. The collecting module 313 can receive interferers transmitted by mobile nodes from the receiving module 312 and collect them as sets 313_1, ..., 313_N as described above.

Further, the base station 21 comprises a selecting and/or ordering module 314 for performing the step 213 of FIG. 2 as described above. The selecting and/or ordering module 314 takes sets of interferers 313_1, ..., 313_N from the collecting module 313 and provides the selected and/or ordered data to the transmitting module 211 for selecting of an appropriate index value by a mobile node 20.

The mobile node 20 comprises checking or selecting module 303, which is configured to perform the step 203 of FIG. 2 as described above. The checking or selecting module 303 can obtain the number of sets of possible interferers from the receiving module 201 for performing the checking or selecting of an appropriate index value. Then, the checking or selecting module 303 can provide the selected index value to transmitting module 302 for transmitting it to base station 21.

The base station 21 comprises cooperation area defining module 315 for performing the step 216 of FIG. 2 as described above. The cooperation area defining module 315 can get the selected index value from the receiving module 312 and provide the information of the cooperation area defined by use of the selected index value to the transmitting module 311 for further providing of this information to the corresponding mobile node 20.

Basically cooperative antenna systems may be implemented also without user grouping. However, when utilizing user grouping, pre-coding techniques like zero forcing, for example, lead to significant power boosting due to difficult channel conditions. At the same time user grouping helps to avoid the worst case user combinations, i.e., as far as possible such users (i.e., mobile nodes or user equipments) are combined in a cooperation area, which have the most intersections with regard to their potential interferers. That means, that the mobile nodes or user equipments are grouped in one common cooperation area such that the sets of possible interferers selected or chosen by these mobile nodes or user equipments should have several (at least one) common possible interferer.

Further, simulations have shown that user centric definition of cooperation areas provides much higher gain than a network centric approach with predefined cooperation areas based on nearest neighborhood of radio cells. The reasons are the unpredictable shadowing conditions in cellular systems. According to the present invention as exemplary explained above, it cooperation areas are organized based on strongest interferes. Thus, the unpredictable shadowing conditions can be handled. In particular, this is supported by the above provided concept according to the present invention with small overall overhead.

Furthermore, the indication of possible sets of strongest interferers (provided, e.g., by indicating cell identifiers of strongest interfering cells) by broadcasting of this information by the base stations or nodes B in according BCH messages, for example, reduces the overhead for establishing of useful cooperation areas, as the base stations or nodes B know in advance, which are the most likely strongest interferers, which have to be measured by the mobile nodes or user equipments. Without this knowledge of the most likely strongest interferers, which is provided to mobile nodes or user equipments according to the present invention, the mobile nodes or user equipments would have to test more than 500 possible cell identifiers, while for the proposed solution probably measurements in the order of 10 strongest interferers should be sufficient. Thus, the present invention provides an efficient and time saving solution of interference handling and of cooperation area determination.

Additionally, based on the feedback of the index values from mobile nodes or user equipments the base stations or nodes B get a rough knowledge about locations of the respective mobile nodes or user equipments with a mean accuracy of about $50\times50$ m$^2$, for example (corresponding to an exemplary size of a cell as provided in an embodiment above). For this purpose, it is assumed that the base stations or nodes B have a mapping from the sets of strongest interferers with the according location in their cell. As this is a long term knowledge it might be stored at the base stations or nodes B based on a network planning knowledge, for example, or the base stations or nodes B might learn about their surrounding by achieving beside the strongest interferers additionally also location information. Here, it is not necessary that all mobile nodes or user equipments transmit the location information to the base stations or nodes B, transmission of this information by at least some of the mobile nodes or user equipments would be sufficient. Nowadays, existing mobile nodes or user equipments comprise GPS and navigation system functionalities. Thus, the location information can be easily provided by the mobile nodes or user equipments.

Moreover, the proposed concept can be easily applied for location based services. In the U.S., for example, location information in the order of 50 m is/will be requested from the government for all mobile nodes or user equipments for emergency calls. Then, the mobile nodes or user equipments will compare their strongest interferers with the index values being broadcasted by the base stations or nodes B. Based on the fed back index values, the base stations or nodes B can determine, in which of the smaller areas of about $50\times50$ m$^2$, for example, the base stations or nodes B are located with an according accuracy. To improve location information also further known location techniques or a combination with other known location techniques like AGPS (Assisted Global Positioning System), for example, can be applied.

As mobile nodes or user equipments can move from one area defined by the according index value into one of the neighbouring areas, the base stations or nodes B might broadcast in addition to the set of possible strongest interferers also a map of strongest interferers, for example. The map of strongest interferers provides then the information of how the strongest interferers are spatially located to each other. As strongest interferer areas will usually have different spatial sizes, this map will be more something like a logical map. Nonetheless, the map of strongest interferers allows for tracking solutions so that the mobile nodes of user equipments will start with measurements only for the most probable sets of strongest interferers, while moving. Furthermore, it can be used to increase the location accuracy, as the moving mobile node or user equipment might detect the more or less well defined borders between two different areas.

Further, for mobile nodes or user equipments having no GPS receiver included, the proposed method could be used to derive positioning based on comparison with interference maps stored at the base station or node B, or in the network. By this means a new kind of inferring cell ID based positioning can be realized according to the present invention.

While embodiments and applications of this invention have been shown and described above, it should be apparent to those skilled in the art, that many more modifications (than mentioned above) are possible without departing from the inventive concept described herein. The invention, therefore, is not restricted except in the spirit of the appending claims. Therefore, it is intended that the foregoing detailed description should be regarded as illustrative rather than limiting.

LIST OF REFERENCES 11 base station
12 base station
13 user equipment or mobile node respectively
14 user equipment or mobile node respectively
15 central unit of a cooperation area
151 a pre-coding matrix
152 a code-book
20 user equipment or mobile node respectively
21 base station
22 user equipment or mobile node respectively
200 detecting of interferers
201 transmitting of detected interferers
202 receiving of a number of sets of possible interferers
203 checks checking of sets of possible interferers with regard to strength of interfering
204 transmitting of a selected identification or index value respectively
205 receiving of information about cooperation area
206 measuring of channel state information
211 receiving of sets of interferers
212 collecting of sets of interferers
213 selecting step
214 transmits of sets of possible interferers
215 receiving of a selected identification or index value respectively
216 defining of a cooperation area
217 informing about the defined cooperation area
301 receiving module
302 transmitting module
303 selecting module
311 transmitting module
312 receiving module
313 collecting module
313_1 set of interferers
313_12 identifier or index value of the set of interferers
313_N set of interferers
313_N2 identifier or index value of the set of interferers
314 selecting and/or ordering module
315 cooperation area defining module

The invention claimed is:

1. A method comprising:
transmitting a number of sets of possible interferers to at least one mobile node by a first base station, the possible interferers in the sets being ordered according to a probability of occurrence, wherein with each set of possible interferers an index value associated with said set of possible interferers is transmitted;
receiving a selected index value from said at least one mobile node by said first base station, said selected index value being associated with a set of possible interferers selected from said number of sets of possible interferers; and
defining a cooperation area for said at least one mobile node by said first base station by use of said selected index value,
said cooperation area being defined by at least said first base station and a second base station of said communications network, said first base station cooperating with said second base station when communicating with mobile nodes in said communications network.

2. The method according to claim 1, said method further comprising receiving a set of interferers from said at least one mobile node by said first base station, said set of interferers comprising interferers interfering communication of said at least one mobile node in said communications network.

3. The method according to claim 2, said method further comprising determining at least one set of possible interferers by use of said set of interferers.

4. The method according to claim 3, wherein determining comprises evaluating said set of interferers at said first base station by determining strongest interferers in said set of interferers.

5. The method according to claim 1, said method further comprising collecting said number of sets of possible interferers by said first base station.

6. A computer program product comprising a non-transitory computer-readable storage medium bearing computer program code embodied therein for use with a computer, the computer program code comprising code for performing the method according to claim 1.

7. An apparatus comprising:
one or more processors; and
one or more memories including computer program code, the one or more memories and the computer program code configured, with the one or more processors, to cause the apparatus to perform at least the following:
transmitting a number of sets of possible interferers to at least one mobile node, the possible interferers in the sets being ordered according to a probability of occurrence, wherein with each set of possible interferers an index value associated with said set of possible interferers is transmitted;
receiving a selected index value from said at least one mobile node, said selected index value being associated with a set of possible interferers selected from said number of sets of possible interferers; and
defining a cooperation area by use of said selected index value,
wherein said apparatus is a first base station, and said cooperation area is defined by at least said first base station and a second base station of said communications network, said first base station cooperating with said second base station when communicating with mobile nodes in said communications network.

8. A method comprising:
- receiving a number of sets of possible interferers from a first base station at a mobile node, the possible interferers in the sets being ordered according to a probability of occurrence, wherein with each set of possible interferers an index value associated with said set of possible interferers is received;
- selecting a set of possible interferers from said number of sets of possible interferers by said mobile node; and
- transmitting a selected index value to said first base station by said mobile node, said selected index value being an index value associated with said selected set of possible interferers,
- wherein said method is for generating cooperation areas in a communications network, wherein each said cooperation area is defined by at least said first base station and a second base station of said communications network, said first base station cooperating with said second base station when communicating with mobile nodes in said communications network.

9. The method according to claim 8, said method further comprising transmitting a set of interferers to said first base station by said mobile node, said set of interferers comprising interferers interfering communication of said mobile node in said communications network.

10. The method according to claim 9, wherein said number of sets of possible interferers is determined by said first base station based on said set of interferers.

11. The method according to claim 8, wherein said selecting said set of possible interferers comprises:
- checking each set of possible interferers of said number of sets of possible interferers with regard to strength of interfering of said mobile node; and
- selecting said set of possible interferes such that it has the highest strength of interfering of said mobile node.

12. A computer program product comprising a non-transitory computer-readable storage medium bearing computer program code embodied therein for use with a computer, the computer program code comprising, code for performing the method according to claim 8.

13. An apparatus comprising:
- one or more processors; and
- one or more memories including computer program code, the one or more memories and the computer program code configured, with the one or more processors, to cause the apparatus to perform at least the following:
- receiving a number of sets of possible interferers from a first base station, the possible interferers in the sets being ordered according to a probability of occurrence, wherein with each set of possible interferers an index value associated with said set of possible interferers is received;
- selecting a set of possible interferers from said number of sets of possible interferers; and
- transmitting a selected index value to said first base station, said selected index value being an index value associated with said set of possible interferers,
- wherein said apparatus is a mobile node, said mobile node being configured for supporting the generation of cooperation areas in a communications network, each said cooperation area being defined by at least said first base station and a second base station of said communications network, said first base station cooperating with said second base station when communicating with mobile nodes in said communications network.

* * * * *